(12) United States Patent  
Hatayama

(10) Patent No.: US 6,747,673 B2  
(45) Date of Patent: Jun. 8, 2004

(54) METHOD, SOFTWARE PRODUCT AND SYSTEM FOR REPRODUCING VIDEO/AUDIO DATA

(75) Inventor: Akemi Hatayama, Tokyo (JP)

(73) Assignee: NEC Corporation, Tokyo (JP)

( * ) Notice: Subject to any disclaimer, the term of this patent is extended or adjusted under 35 U.S.C. 154(b) by 490 days.

(21) Appl. No.: 09/825,192

(22) Filed: Apr. 3, 2001

(65) Prior Publication Data

US 2002/0054077 A1 May 9, 2002

(30) Foreign Application Priority Data

Mar. 4, 2000 (JP) ..................................... 2000-100255

(51) Int. Cl.$^7$ ............................................... G06F 3/00
(52) U.S. Cl. ....................... 345/716; 345/719; 345/723; 345/724
(58) Field of Search ................................ 345/723, 724, 345/719, 721, 716; 386/4, 52, 55, 65, 56; 715/530, 539

(56) References Cited

U.S. PATENT DOCUMENTS

| | | | |
|---|---|---|---|
| 5,109,482 A | | 4/1992 | Bohrman ..................... 345/723 |
| 5,191,645 A | * | 3/1993 | Carlucci et al. ............ 345/723 |
| 5,937,136 A | | 8/1999 | Sato ............................ 386/52 |
| 6,119,154 A | * | 9/2000 | Weaver et al. ............... 709/219 |
| 6,278,432 B1 | * | 8/2001 | Ratnakar ..................... 345/748 |

FOREIGN PATENT DOCUMENTS

| | | |
|---|---|---|
| EP | 0 801 391 A3 | 10/1997 |
| EP | 0 801 391 A2 | 10/1997 |
| JP | 9-81445 | 3/1997 |
| JP | 10-171728 | 6/1998 |
| JP | 2001-148841 | 5/2001 |

OTHER PUBLICATIONS

Edwards W.K., "The Design and Implementation of the Montage Multimedia Mail System", *Communications for Distributed Applications and Systems–Proceedings of the Conference on Communications Software (TRICOMM)*, New York, IEEE, US 4:47–57 (1991), XP010039767.

Kervella B., et al., "Towards a Complete Multimedia Mail: Use of MHEG in Standard Messaging Systems", *Multimedia Transport and Teleservices. International Cost 237 Workshopproceedings* 1–13 (1994), XP–000585291.

Alvear J., "Streaming E–Mail", *Web Developper.Com Guide to Streaming Multimedia*, New York: John Wiley & Sons, US 303–317 (1998), XP–002150023.

* cited by examiner

*Primary Examiner*—John Cabeca
*Assistant Examiner*—Kieu D. Vu
(74) *Attorney, Agent, or Firm*—Scully, Scott, Murphy & Presser

(57) ABSTRACT

A memory in a video/audio-processing unit retains data of video and audio received from a video mail system and data of new input video and audio. According to user operations, a video/audio-processing unit creates metadata. The metadata includes range data representing a quotation range or ranges of the received video and audio, and information that represents the arrangement order of the new input video and audio. In response to the received video and audio, the video mail system transmits only the metadata and the new input video and audio to a video mail system. According to the contents of the metadata, the video mail system uses the transmitted video and audio and thereby reproduces the overall new video and audio.

18 Claims, 3 Drawing Sheets

METHOD, SOFTWARE PRODUCT AND SYSTEM FOR REPRODUCING VIDEO/AUDIO DATA

BACKGROUND OF THE INVENTION

1. Field of the Invention

The present invention relates to a video/audio-creating method and a video/audio-creating system. (In this document, "video/audio" means "video and/or audio".)

2. Description of the Related Art

Recently, video cameras and personal computers for home-use (PCs) have been widely used, and an increasing number of people perform Internet-based communication using video/audio. A representative example of the types of media used for communication is electronic mail. Recently, electronic mail frequently exchanged include not only simple text data, but also video/audio.

In ordinary communication using electronic mail containing only text data, the contents of a received electronic mail are quoted to create a response mail. Thereby, pseudo-interactive communication is implemented. However, a method for sending a response mail quoting video/audio has not been developed to date. If a method is realized to enable an electronic mail containing video/audio to be quoted in a response mail as in the case of an electronic mail containing only text data, the usability thereof is considered to be significantly greater.

In the development of a method that enables video/audio received in an electronic mail to be quoted in a response mail, a major technical problem arises in how to reduce the amount of communication data. Generally, since video/audio is composed of a relatively large amount of data, a simple exchange of electronic mails using video/audio requires much communication time and cost.

Recently, television-based video/audio broadcasts can be recorded and stored as digital data in a PC or on a home-use server. Thereby, personal editorial processing is popularly performed for video and audio. Also in this case, since the amount of video/audio data is large, a reduction in the amount of data to be stored would be advantageous in miniaturization of a storage device and in the reduction of costs.

SUMMARY OF THE INVENTION

The present invention is made in view of the above-described problems. Accordingly, an object of the invention is to provide a video/audio-creating method and a video/audio-creating system that allow for a significant reduction in the amount of data, for example, transmitted in an electronic-mail communication and the amount of data to be stored in a storage device.

In order to achieve the above object, the present invention provides a method of reproducing a video/audio data set. The method comprises the steps of: (1) storing first data set of a video/audio data set into first memory; (2) copying the first data set from the first memory to second memory; (3) designating one or plural ranges in the first data set and a sequence of the ranges on the second memory; (4) sending the ranges and the sequence from the second memory to the first memory; and (5) reproducing the ranges in order of the sequence with reference to the first memory.

In the method, the second memory may store one or plural second data set(s) at the step (1). In this case, one or plural ranges in the first data set, and a sequence of the ranges and the second data set(s) are designated with reference to the second memory at the step (3). Third data set (metadata), which represents the ranges and the sequence and which includes the second data set(s), is generated with reference to the first memory. The third data set is sent from the second memory to the first memory at the step (4). And the ranges of the first data set and the second data set(s) are reproduced in order of the sequence with reference to the first memory.

In the method, at least one of the data sets transmitted between the first and second memories may be attached to an electronic mail.

In the method, the first and second memories may be embedded on different terminal devices from each other. Otherwise, the first and second memories may be embedded on different server devices from each other.

In the method, the first data set stored on the first memory at the step (1) may be previously received as broadcast video/audio. The step (5) may be made in order to broadcast the ranges of the first data set in order of the sequence.

Furthermore, in order to achieve the above object, the present invention provides a software product for reproducing a video/audio data set by computer. The software product comprises the processes of: (1) storing first data set of a video/audio data set into first memory; (2) copying the first data set from the first memory to second memory; (3) designating one or plural ranges in the first data set and a sequence of the ranges on the second memory; (4) sending the ranges and the sequence from the second memory to the first memory; and (5) reproducing the ranges in order of the sequence with reference to the first memory.

In the software product, the second memory may store one or plural second data set(s) at the process (1). In this case, one or plural ranges in the first data set, and a sequence of the ranges and the second data set(s) are designated with reference to the second memory at the process (3). Third data set, which represents the ranges and the sequence and which includes the second data set(s), is generated with reference to the first memory. The third data set is sent from the second memory to the first memory at the process (4). And the ranges of the first data set and the second data set(s) are reproduced in order of the sequence with reference to the first memory.

In the software product, at least one of the data sets transmitted between the first and second memories may be attached to an electronic mail.

In the software product, the first and second memories may be embedded on different terminal devices from each other. Otherwise, the first and second memories may be embedded on different server devices from each other.

In the software product, the first data set stored on the first memory at the process (1) may be previously received as broadcast video/audio. The process (5) may be made in order to broadcast the ranges of the first data set in order of the sequence.

And furthermore, in order to achieve the above object, the present invention provides a system for reproducing a video/audio data set by computer. The system comprises: first memory for storing first data set of a video/audio data set; second memory for being copied the first data set from the first memory; a unit for designating one or plural ranges in the first data set and a sequence of the ranges on the second memory; a unit for sending the ranges and the sequence from the second memory to the first memory; and a unit for reproducing the ranges in order of the sequence with reference to the first memory.

In the system, the second memory may store one or plural second data set(s). In this case, the unit for designating designates one or plural ranges in the first data set, and a sequence of the ranges and the second data set(s) with reference to the second memory. The system further comprises a unit for generating third data sent which represents the ranges and the sequence and which includes the second data set(s) with reference to the first memory. The unit for sending sends the third data set from the second memory to the first memory. And the unit for reproducing reproduces the ranges of the first data set and the second data set(s) in order of the sequence with reference to the first memory.

In the system, at least one of the data sets transmitted between the first and second memories may be attached to an electronic mail.

In the system, the first and second memories may be embedded on different terminal devices from each other. Otherwise, the first and second memories may be embedded on different server devices from each other.

The system may further comprise a unit for receiving broadcast video/audio. In this case, the first memory stores received video/audio by the means for receiving as the first data set.

The system may further comprise a unit for broadcasting which broadcasts reproduction of the means for reproducing.

Accordingly, to reproduce the new video/audio including at least one portion of the first video/audio, the present invention requires only the metadata and the second video/audio, but does not require connected data of the portion of the data of the first video/audio and the data of the second video/audio.

Also, to create the new video/audio in response to video/audio transmitted via an electronic mail by quoting at least one portion of the received video/audio, only the metadata and video/audio to be added needs to be transmitted. Therefore, communication data can be significantly reduced.

Furthermore, even to create new video/audio for transmission, the second memory is used to store only new video/audio data to be added and the metadata. Therefore, the invention is advantageous in reducing required capacity of the memory device or storage device.

DESCRIPTION OF THE PREFERRED EMBODIMENTS

Hereinbelow, embodiments of the present invention will be described with reference to the accompanying drawings.

Figure 1:
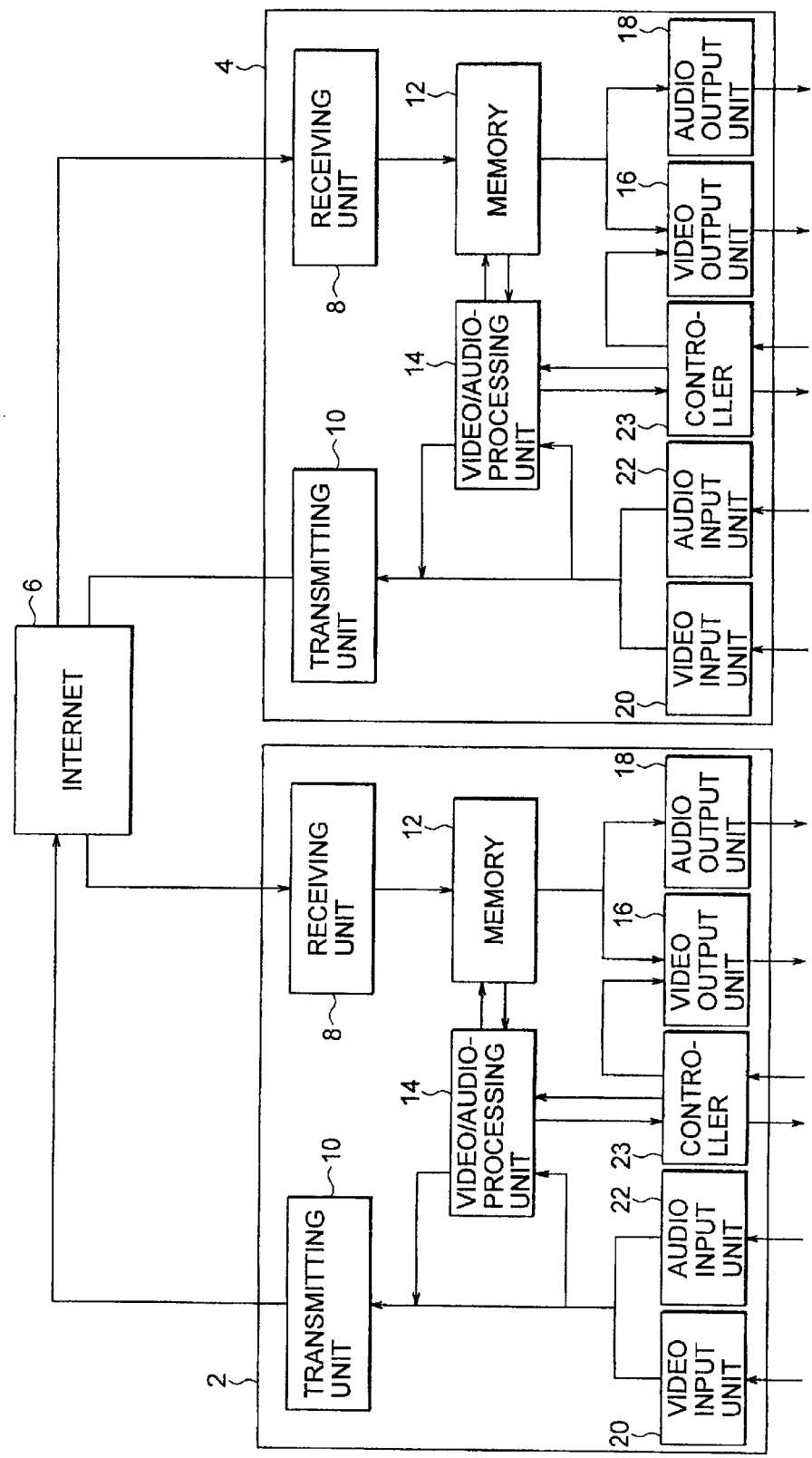
FIG. 1 is a schematic view of a set of video mail systems as an example of a video/audio-creating system according to a first embodiment of the present invention.
Figure 2A:
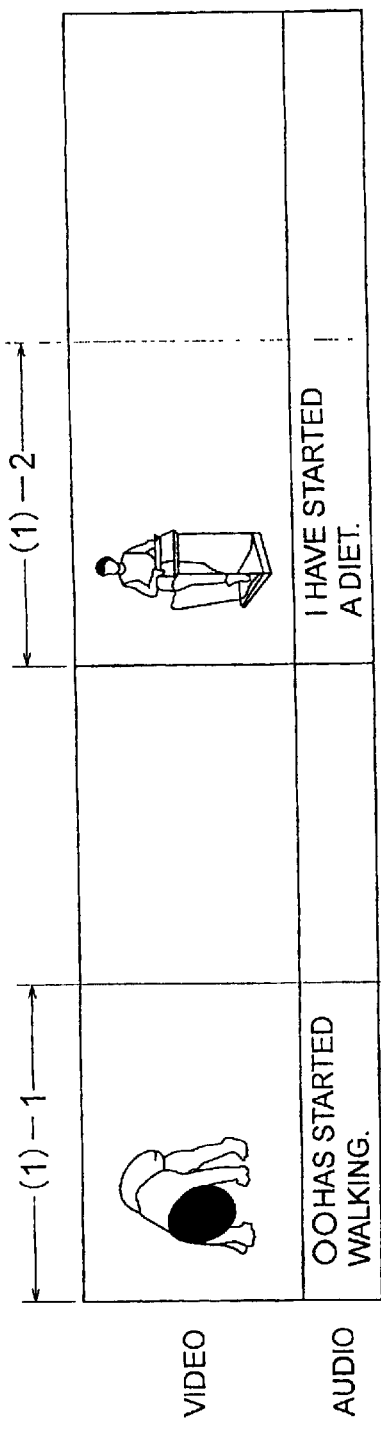
FIG. 2A is a schematic view showing contents of original video and audio data.
Figure 2B:
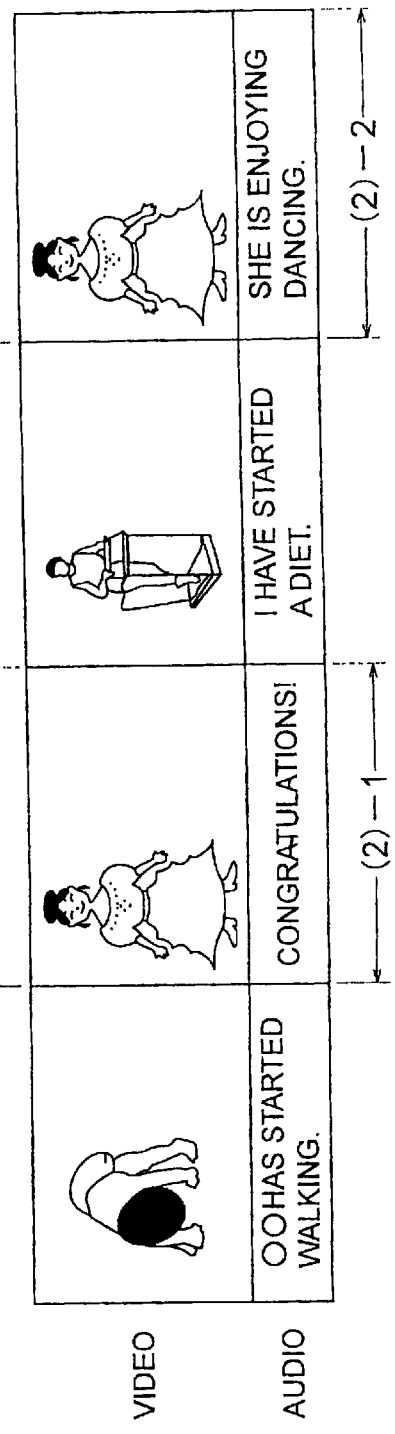
FIG. 2B is a schematic view showing the contents of video/audio data created by quoting the original video/audio data shown in FIG. 2A.
Figure 3:
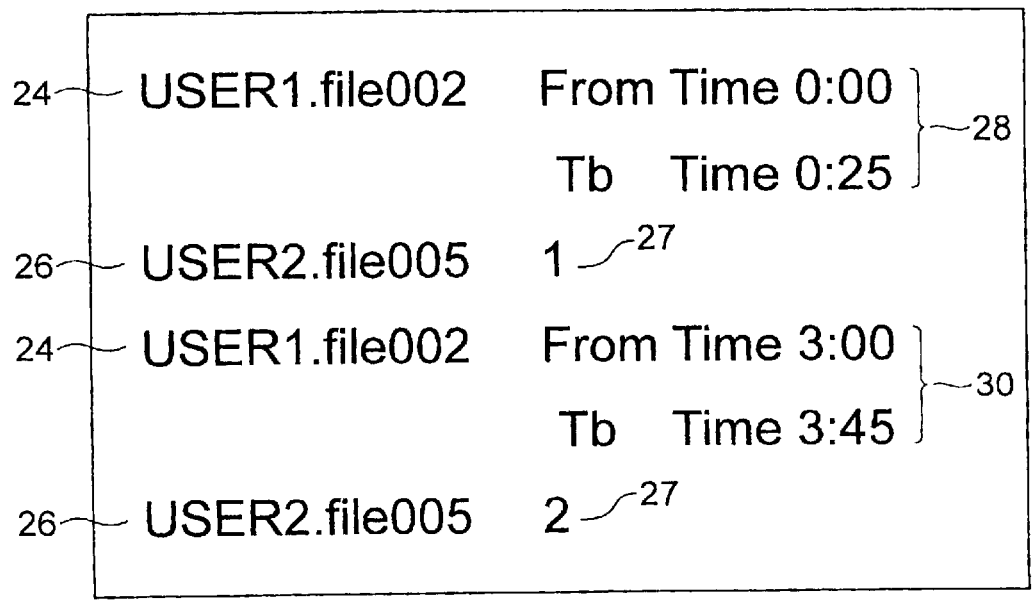
FIG. 3 shows example contents of metadata used in the video mail system shown in FIG. 1.

FIG. 1 is a schematic view of a set of video mail systems as an example of a video/audio-creating system according to a first embodiment of the present invention. FIG. 2A is a schematic view showing the contents of original video and audio data transmitted from a user 1 and received by a user 2. FIG. 2B is a schematic view showing the contents of video/audio data created by quoting portions of the original video/audio data shown in FIG. 2A and by adding new video/audio. FIG. 3 shows example contents of metadata used in the video mail systems shown in FIG. 1. Hereinbelow, referring to these drawings, a description will be made regarding the example video/audio-creating system and a video/audio-creating method according to the embodiments of the present invention.

As shown in FIG. 1, video mail systems 2 and 4 according to the first embodiment are connected together via, for example, the Internet 6. The video mail systems 2 and 4 have the same configuration. The configuration includes a receiving unit 8, a transmitting unit 10, a memory 12, and a video/audio-processing unit 14.

Through the Internet 6, the receiving unit 8 receives an electronic mail including video/audio, that is, a video mail.

The memory 12 (one of first and second storing units according to the present invention) stores video mails received by the receiving unit 8, video mails being edited, and transmitted video mails.

The video output unit 16 and the audio output unit 18 generate video signals and audio signals, respectively, from data of the received video mail, the video mail being edited, and the transmitted video mail. Thereby, the video output unit 16 and the audio output unit 18 reproduce video and audio, respectively.

Through the Internet 6, the transmitting unit 10 transmits the video mail created by sending to one of the video mail systems 2 and 4.

Using the video/audio data stored in the memory 12, the video/audio-processing unit 14 creates the video mail that will be transmitted, and generates information required for playback of the video/audio. The video/audio-processing unit 14 forms a range-data generating unit, a metadata-generating unit, and a reproducing unit, as described below in detail.

A video input unit 20 and an audio input unit 22 take out video signals and audio signals, respectively, from outside sources, and feed them into the video/audio-processing unit 14.

A controller 23 functions as an interface with a user. A user-issued command is input through a user interface (not shown), such as a keyboard, a mouse, or a microphone. The controller 23 transfers the command to the video/audio-processing unit 14, a video output unit 16, and an audio output unit 18. Also, the controller 23 outputs a response from the video/audio-processing unit 14 or the like to a playback apparatus (not shown).

Hereinbelow, a description will be made regarding operations of the video mail systems 2 or 4 individually configured as described above. The description is made on the assumption that communication is performed as follows. A user of the video mail system 2 first sends a video mail to the video mail system 4. A user of the video mail system 4 receives the video mail, creates a new response video mail by quoting at least one portion of the received video mail, and transmits the created response video mail to the user of the video mail system 2.

For the user of the video mail system 2 to transmit video mail, the user first inputs a video signal and an audio signal which will be transmitted through the video input unit 20 and the audio input unit 22, respectively. The video/audio-processing unit 14 once stores the input video signal and the input audio signal as retrievable video data and retrievable audio data, respectively, by using the memory 12. Subsequently, the video/audio-processing unit 14 reads the data from the memory 12 and feeds the data in a predetermined form of video mail to the video mail system 4 through the Internet 6.

In the video mail system 4, the video mail is received by the receiving unit 8, and the data thereof is stored in the memory 12. The video/audio-processing unit 14 in the video mail system 4 analyzes the video mail data stored in the memory 12. In this case, the video mail is assumed to be simply formed of ordinary video/audio data. Therefore, the video/audio-processing unit 14 reports simple information regarding, for example, the stored position in the memory 12, to the controller 23. The controller 23 reports the aforementioned information to the video output unit 16 and the audio output unit 18. Thereby, the controller 23 controls the video output unit 16 and the audio output unit 18 to reproduce the video/audio from the video signal and the audio signal according to the respective video data and audio data that are stored in the memory 12.

The user of the video mail system 4 creates a response by quoting the video/audio included in the received video mail. To create the response, while viewing the video reproduced on the video output unit 16 and/or hearing the audio reproduced on the audio output unit 18, the user simultaneously operates the user interface by, for example, the aforementioned keyboard, and thereby specifies quotation ranges of the video/audio.

A range-specifying operation is passed to the video/audio-processing unit 14 through the controller 23. According to a signal received from the controller 23, the video/audio-processing unit 14 generates range data that specifies one or more ranges of the original received video/audio (first video/audio according to the present invention). For example, the range data can be controlled to represent a start time of the received video/audio to be "0". FIG. 2A shows examples of video and audio transmitted from the user of the video mail system 2 to the user of the video mail system 4. In the figure, the ranges of video and audio shown by (1)-1 and (1)-2 are selected by the user of the video mail system 4 for quotation. A start time and a completion time of the range shown by (1)-1 are assumed to be, for example, "0:00" and "0:25", respectively. A start time and a completion time of the range shown by (1)-2 are assumed to be, for example, "3:00" and 3:45, respectively. According to the times, the video/audio-processing unit 14 generates the aforementioned range data.

Subsequently, through the video input unit 20 and the audio input unit 22, the user of the video mail system 4 inputs video/audio data (second video/audio according to the present invention) that will be added to the aforementioned video/audio selected for quotation. The video/audio-processing unit 14 receives the data, and once stores the data by using the memory 12. In addition, through the controller 23, the video/audio-processing unit 14 controls the video output unit 16 and the audio output unit 18 to reproduce the video and audio according to the data stored in the memory 12.

While viewing and hearing the reproduced video and audio, the user of the video mail system 4 simultaneously operates the user interface, such as the keyboard, and thereby issues commands to the video/audio-processing unit 14 through the controller 23. The commands are issued to specify, for example, new video and audio to be added, the order of arrangement of the video and audio to be added, and the video and audio to be quoted.

FIG. 2B schematically shows an example video and audio to be created through the operation described above. In the examples, the aforementioned video and audio shown by (1)-1 are arranged as the video and audio to be quoted first. Subsequently, input new video and audio shown by (2)-1 are arranged. Furthermore, the aforementioned video and audio shown by (2)-1 and input new video and audio shown by (2)-2 are subsequently arranged in that order.

According to the commands issued by the user, the video/audio-processing unit 14 generates metadata. The metadata includes the range data generated for the video and audio received from the video mail system 2, specification data that specifies the video and audio (2)-1 and (2)-2, specification data that specifies the video and audio received from the video mail system 2, and information representing the arrangement order of the aforementioned video/audio.

For example, the metadata is composed of text data, of which the contents are illustrated in FIG. 3. In FIG. 3, specification data 24 represents the video and audio that will be quoted, and specification data 26 represents the new video and audio to be added and transmitted. In addition, pieces of range data 28 and 30 (right side in FIG. 3) are arranged, which individually correspond to the specification data 24. For the specification data 26, an identification number 27 is arranged. It identifies at least one portion of the video and audio represented by the specification data 26.

Sets of the specification data 24 and 26, the range data 28 and 30, and the identification number 27 are sequentially arranged downwards. The order of the arrangement represents the order in which playback of the video and audio is performed.

Subsequently, according to commands input by the user through the controller 23, the video/audio-processing unit 14 in the video mail system 4 reads the above-described metadata and additional video/audio data from the memory 12. Subsequently, the video/audio-processing unit 14 incorporates all the aforementioned read data into a data package and feeds it to the transmitting unit 10. The data is then transmitted from the transmitting unit 10 to the video mail system 2 through the Internet 6.

In the video mail system 2, the transmitted data is received by the receiving unit 8, and the received data is stored in the memory 12. Then, the video/audio-processing unit 14 analyzes the data received and stored in the memory 12. In this case, the received data includes the metadata, and the metadata includes the specification data 24 (shown in FIG. 3) representing the transmitted video and audio. According to the transmitted video mail data stored in the memory 12, the video/audio-processing unit 14 notifies the controller 23 of stored positions corresponding to the range data 28 and 30.

In addition, according to the specification data 26 and the above-described identification number 27, the video/audio-processing unit 14 notifies the controller 23 of positions in the memory 12 in which the received video and audio data are stored.

Moreover, according to the arrangement order of the sets of the specification data 24 and 26, the range data 28 and 30, and the identification number 27, the video/audio-processing unit 14 notifies the controller 23 of the playback order.

According to the aforementioned information, the controller 23 controls the video output unit 16 and the audio output unit 18 so that a playback of the video and audio specified by the video/audio-processing unit 14 in the specified order is performed.

Under the aforementioned control, from the memory 12, the video output unit 16 and the audio output unit 18 retrieve the video and audio data represented by the range data 28 and 30 in the video and audio data represented by the specification data 24 included in the aforementioned metadata. In addition, from the memory 12, the video output unit 16 and the audio output unit 18 retrieve the video and audio data specified by the specification data 26 included in the metadata. Then, the video output unit 16 and the audio output unit 18 generate and output signals of the video and signals of the audio, respectively, according to the order in which the sets of specification data 24 and 26 and the range data 28 and 30 are arranged.

As described above, according to the present embodiment, in the video mail system 2, the new video and audio that include the quoted portions of the original video and audio transmitted in the early stage from the video mail system 2 can be reproduced overall only by receiving the new video and audio data added in the video mail system 4 and the metadata.

Thereby, according to the present embodiment, in the video mail system 4 when transmitting a new response video mail containing quoted portions of the received video and audio, the amount of data to be transmitted can be significantly reduced.

According to the present embodiment, the video mail is created such that after all the ranges of the video and audio to be quoted are selected, the new video and audio to be added are specified. However, the procedure may of course be modified. For example, the video mail may be created in the following order. The video and audio shown by (1)-1 are first selected, and the video and audio to be added and inserted are then selected. Thereafter, the video and audio shown by (1)-2 are selected, and subsequently, the video and audio to be added and inserted are selected.

Hereinbelow, a description will be made regarding a second embodiment of the present invention.

Figure 4:
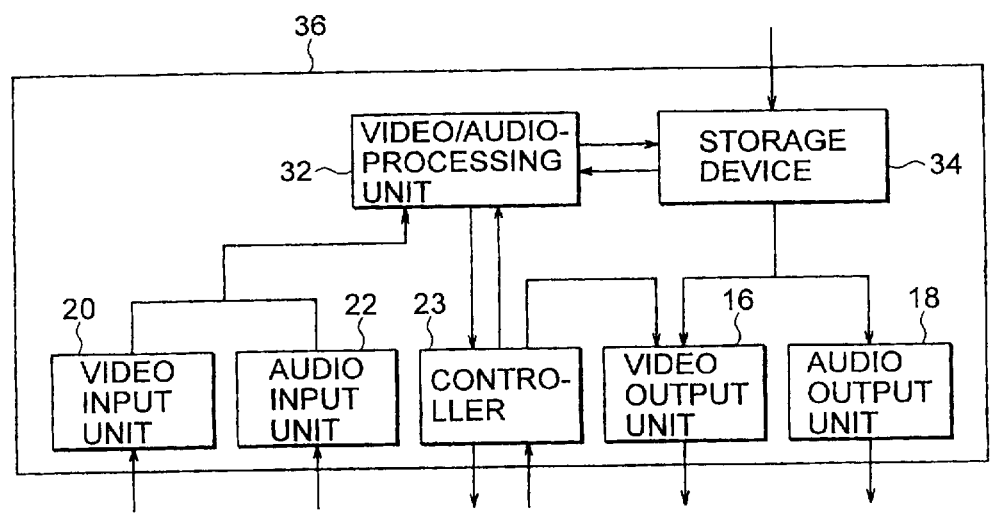
FIG. 4 is a schematic view of a video/audio-editing system according to a second embodiment of the present invention.

FIG. 4 is a schematic view of a video/audio-editing system 36 according to the second embodiment of the present invention. In FIG. 4, the same reference numerals as those in FIG. 1 are used for the same portions as those shown therein.

A video/audio-processing unit 32 is the same as the memory 12 except that it does not have communication-related functions.

The video/audio-editing system 36 of the second embodiment can be effectively used, for example, in a case where television-broadcast video and audio are recorded, and the recorded video and audio are partly used to create a new video and audio.

Specifically, the data of the aforementioned recorded video and audio is stored in the memory 12 as video data corresponding to the data of the video and audio data stored in the memory 12 when the video mail is received in the video mail system 4 from the video mail system 2. As in the same manner as described above, the new video and audio to be added are input through the video input unit 20 and the audio input unit 22. Then, the video/audio-processing unit 32 once stores the data of the video and audio by using the memory 12.

Subsequently, as in the case of the video mail system 4, a user operates a user interface (not shown), such as a keyboard (not shown), to create the video and audio as shown in FIG. 2B. In response to the user operation, the video/audio-processing unit 32 creates metadata, and packetizes the metadata and the input new video and audio data.

According to the packetized metadata and the input new video and audio data, the video/audio-processing unit 32, which functions as a reproducing unit, controls the video output unit 16 and the audio output unit 18 through the controller 23 to reproduce the new video and audio created with at least one portion of the video and audio recorded and stored in the memory 12 and the input new video and audio.

Therefore, in the second embodiment, the memory 12 is used to store only the data of the video and audio to be added and the metadata in order to create the new video and audio. Therefore, the storage capacity of the memory 12 may be small.

In addition, in this embodiment, the recorded video and audio are used to obtain the above-described effects. However, the video/audio-editing system 36 of the present embodiment may be used in the stage where prebroadcast video and audio are edited in a broadcasting station. This also allows for effects equivalent to those described above to be obtained.

Hereinbelow, a third embodiment of the present invention will be described.

A case can arise in which after a broadcast video/audio is recorded, communication, such as that in a "TV community" (according to Japanese Patent Application No. Hei 11-330042, namely, 330042/1999), is made with a different broadcast-program viewer who recorded the video/audio, and messages are exchanged by quoting the recorded video/audio and adding the new video/audio. Even in this case, when metadata similar to that according to the first or second embodiments is used, only added new portions of the video and audio are required to be exchanged.

In addition, the configuration may be modified to include a server system that can be accessed by a plurality of persons through communication lines. In this case, the original video/audio data to be quoted is stored in the same server system, and the new video/audio data to be added is stored in the server system together with the metadata. According to this configuration, a plurality of persons can obtain the portions quoted from the original video/audio data, the added video/audio data, and the metadata from the server system to reproduce the video/audio.

As described above, the present invention can reproduce the new video/audio including at least one portion of the first video/audio only by using the metadata and the second video/audio data without using connected data of the portion or portions of the first video/audio and the second video/audio data.

To create the new video/audio in response to the video/audio transmitted via an electronic mail by quoting the portion or portions of the received video/audio, only the metadata and the video/audio to be added need to be transmitted. Therefore, the amount of communication data can be significantly reduced.

Furthermore, according to the present invention, even to create the new video/audio for transmission, the storing unit is used to store only the new video/audio data to be added and the metadata. Therefore, the invention is advantageous in reducing required storage capacity of the storing unit.

What is claimed is:

1. A method of reproducing at least one of a video and an audio data set, comprising the steps of:
   (1) storing first data set of at least one of a video and an audio data set into first memory, and one or plural second data sets in a second memory;
   (2) copying the first data set from the first memory to second memory;

(3) designating one or plural ranges in the first data set and a sequence of the ranges and the one or plural second data sets on the second memory;

(4) generating a third data set that represents the ranges and the sequence and which includes the one or plural second data sets with reference to the second memory;

(5) sending the third data set from the second memory to the first memory; and (6) reproducing the ranges of the first data set and the one or plural second data sets in order of the sequence with reference to the first memory.

2. The method claimed in claim 1, wherein at least one of the data sets transmitted between the first and second memories is attached to an electronic mail.

3. The method claimed in claim 1, wherein the first and second memories are embedded on different terminal devices from each other.

4. The method claimed in claim 1, wherein the first and second memories are embedded on different server devices from each other.

5. The method claimed in claim 1, wherein the first data set stored on the first memory at the step (1) is previously received as broadcast video/audio.

6. The method claimed in claim 1, wherein the step (6) is made in order to broadcast the ranges of the first data set in order of the sequence.

7. A program storage device, tangibly embodying a program of instructions executable by a machine to perform a method for reproducing at least one of a video and an audio data set, the method comprising the steps of:

(1) storing first data set of a video/audio data set into first memory, and one or plural second data sets in a second memory;

(2) copying the first data set from the first memory to second memory;

(3) designating one or plural ranges in the first data set and a sequence of the ranges and the one or plural second data sets on the second memory;

(4) generating a third data set that represents the ranges and the sequence and which includes the one or plural second data sets with reference to the second memory;

(5) sending the third data set from the second memory to the first memory; and (6) reproducing the ranges of the first data set and the one or plural second data sets in order of the sequence with reference to the first memory.

8. The program storage device claimed in claim 7, wherein at least one of the data sets transmitted between the first and second memories is attached to an electronic mail.

9. The program storage device claimed in claim 7, wherein the first and second memories are embedded on different terminal devices from each other.

10. The program storage device claimed in claim 7, wherein the first and second memories are embedded on different server devices from each other.

11. The program storage device claimed in claim 7, wherein the first data set stored on the first memory at the process (1) is previously received as a broadcast of at least one of a video and an audio.

12. The program storage device claimed in claim 7, wherein the process (6) is made in order to broadcast the ranges of the first data set in order of the sequence.

13. A system for reproducing at least one of a video and an audio data set by computer, the system comprising:

first memory for storing first data set of at least one of a video and an audio data set;

second memory for being copied the first data set from the first memory and storing one or plural second data sets;

means for designating one or plural ranges in the first data set and a sequence of the ranges and the one or plural second data sets on the second memory;

means for generating a third data which represents the ranges and the sequence and which includes the one or plural second data sets with reference to the second memory;

means for sending the third data set from the second memory to the first memory; and means for reproducing the ranges of the first data set and the one or plural second data sets in order of the sequence with reference to the first memory.

14. The system claimed in claim 13, wherein at least one of the data sets transmitted between the first and second memories is attached to an electronic mail.

15. The system claimed in claim 13, wherein the first and second memories are embedded on different terminal devices from each other.

16. The system claimed in claim 13, wherein the first and second memories are embedded on different server devices from each other.

17. The system claimed in claim 13, further comprising means for receiving a broadcast of at least one of a video and an audio, wherein the first memory stores the received at least one of a video and an audio by the means for receiving as the first data set.

18. The system claimed in claim 13, further comprising means for broadcasting which broadcasts reproduction of the means for reproducing.

* * * * *

UNITED STATES PATENT AND TRADEMARK OFFICE
CERTIFICATE OF CORRECTION

PATENT NO. : 6,747,673 B2
DATED : June 8, 2004
INVENTOR(S) : Akemi Hatayama

It is certified that error appears in the above-identified patent and that said Letters Patent is hereby corrected as shown below:

<u>Title page,</u>
Item [30], Foreign Application Priority Data, "Mar. 4, 2000" should read -- Apr. 3, 2000 --.

Signed and Sealed this

Twenty-third Day of May, 2006

JON W. DUDAS
*Director of the United States Patent and Trademark Office*